United States Patent
Vapsi et al.

(10) Patent No.: US 12,547,385 B2
(45) Date of Patent: Feb. 10, 2026

(54) SYSTEM CONTROL LANGUAGE FOR PLANNING AND EXECUTION

(71) Applicant: JP Morgan Chase Bank, N.A., New York, NY (US)

(72) Inventors: Annita Vapsi, New York, NY (US); Daniel Borrajo, Pozuelo de Alarcon (ES); Manuela Veloso, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 245 days.

(21) Appl. No.: 18/537,584

(22) Filed: Dec. 12, 2023

(65) Prior Publication Data
US 2025/0190190 A1 Jun. 12, 2025

(51) Int. Cl.
*G06F 8/41* (2018.01)
*G06F 8/30* (2018.01)

(52) U.S. Cl.
CPC ............... *G06F 8/42* (2013.01); *G06F 8/311* (2013.01)

(58) Field of Classification Search
CPC .................................. G06F 8/311; G06F 8/42
See application file for complete search history.

(56) References Cited

U.S. PATENT DOCUMENTS

2016/0321544 A1* 11/2016 Hassanzadeh ........ G06F 16/285
2018/0218267 A1* 8/2018 Halim ...................... G06N 7/01

FOREIGN PATENT DOCUMENTS

JP 2008030136 A * 2/2008
KR 101977274 B1 * 8/2019 ............ B25J 9/1664

OTHER PUBLICATIONS

Gebser et al., "plasp: A Prototype for PDDL-Based Planning in ASP" (Year: 2011).*
Alan, "On Using Action Inheritance and Modularity in PDDL Domain Modelling" (Year: 2023).*
(Continued)

*Primary Examiner* — Phillip H Nguyen
(74) *Attorney, Agent, or Firm* — Wood IP, LLC; Theodore A. Wood (57) ABSTRACT

Provided is a system control planning-execution monitoring architecture, including a planning domain portal configured to analyze planning domain related files received from a user and specify a planning domain; a planning problem portal configured to analyze planning problem related files received from the user the user and specify a planning problem therefrom and a planner module configured to receive outputs from the planning domain portal and the planning problem portal and output a plan including a list of actions for completion by the system. The system also produces an active language (ALA) program responsive to the plan output from the planner including embedded monitoring checkpoints. A syntactic analysis module is configured to receive as an input the ALA program and definition of a syntax of the ALA program and produce an abstract syntax tree (AST) therefrom; and an executive module configured to (i) receive an input from the planning domain portal, (ii) determine how components of ALA should be executed based on the received planning domain input in the components of the ALA.

18 Claims, 6 Drawing Sheets

(56) References Cited

OTHER PUBLICATIONS

Tan, "PDDL.jl: An Extensible Interpreter and Compiler Interface for Fast and Flexible AI Planning" (Year: 2022).*

Alfonso, "An Introduction to the Planning Domain Definition Language (PDDL): Book review" (Year: 2020).*

Cashmore, M.; Fox, M.; Long, D.; Magazzeni, D.; Ridder, B.; Carrera, A.; Palomeras, N.; Hurtos, N.; and Carreras, M. 2015. ROSPlan: Planning in the Robot Operating System. In Proceedings of the International Conference on Automated Planning and Scheduling, vol. 25, 333-341.

Colledanchise, M.; and Ogren, P. 2017. Behavior Trees in Robotics and AI: An Introduction. CoRR, abs/1709.00084.

Colledanchise, M.; and Ogren, P. 2017. How Behavior Trees Modularize Hybrid Control Systems and Generalize Sequential Behavior Compositions, the Subsumption Architecture, and Decision Trees. IEEE Transactions on Robotics, 33(2): 372-389.

Despouys, O.; and Ingrand, F. F. 1999. Propice-Plan: Toward a Unified Framework for Planning and Execution. In Proceedings of the 5th European Conference on Planning: Recent Advances in AI Planning, ECP '99, 278-293. Berlin, Heidelberg: Springer-Verlag. ISBN 3540678662.

Ghallab, M.; Nau, D.; and Traverso, P. 2016. Automated planning and acting. Cambridge University Press.

Goldman, R. P.; Bryce, D.; Pelican, M. J. S.; Musliner, D. J.; and Bae, K. 2016. A Hybrid Architecture for Correct- byConstruction Hybrid Planning and Control. In NASA Formal Methods, 388-394. Springer International Publishing. ISBN 978-3-319-40648-0.

Guzman, C .; Alcáazar, V.; Prior, D.; Onaindía, E.; Borrajo, D.; Fdez-Olivares, J.; and Quintero, E. 2012. PELEA: a Domain-Independent Architecture for Planning, Execution and Learning. In Proceedings of ICAPS'12 Scheduling and Planning Applications woRKshop (SPARK), 38-45. Atibaia (Brazil): AAAI Press.

Ingham, M. D.; Ragno, R. J.; and Williams, B. C. 2001. A Reactive Model-based Programming Language for Robotic Space Explorers. In In Proc. International Symp. on Artificial Intelligence, Robotics and Automation in Space.

Ingrand, F.; Chatila, R.; Alami, R.; and Robert, F. 1996. PRS: a high level supervision and control language for autonomous mobile robots. In Proceedings of IEEE International Conference on Robotics and Automation, vol. 1, 43-49.

Macenski, S.; Foote, T.; Gerkey, B.; Lalancette, C.; and Woodall, W. 2022. Robot Operating System 2: Design, architecture, and uses in the wild. Science Robotics, 7(66): eabm6074.

Omg, O. M. G. 2021. Decision Model and Notation Specification. https://www.omg.org/spec/DMN/1.3. Accessed: Feb. 1, 2023.

Parr, T. 1992. ANTLR. https://www.antlr.org/. Accessed: Jan. 15, 2022.

Patra, S.; Ghallab, M.; Nau, D.; and Traverso, P. 2019a. Acting and Planning Using Operational Models. In Proceedings of the AAAI Conference on Artificial Intelligence, vol. 33-01, 7691-7698.

Patra, S.; Ghallab, M.; Nau, D.; and Traverso, P. 2019b. APE: An Acting and Planning Engine. Advances in Cognitive Systems, 7: 175-194.

Patra, S.; Mason, J.; Kumar, A.; Ghallab, M.; Traverso, P.; and Nau, D. 2020. Integrating Acting, Planning and Learning in Hierarchical Operational Models. arXiv:2003.03932.

Pinover, K.; Ferguson, E .; Bindschadler, D.; and Schimmels, K. 2020. The Reference Activity Plan: Collaborative, Agile Planning for NASA's Europa Clipper Mission. In 2020 IEEE Aerospace Conference, 1-13.

Schaffer, S.; Russino, J.; Wong, V.; Justice, H.; and Gaines, D. 2018. Integrated Planning and Execution for a SelfReliant Mars Rover. In International Conference on Automated Planning and Scheduling, Workshop on Integrated Planning, Acting and Execution.

Simmons, R.; and Apfelbaum, D. 1998. A task description language for robot control. In Proceedings. 1998 IEEE/RSJ International Conference on Intelligent Robots and Systems. Innovations in Theory, Practice and Applications (Cat. No. 98CH36190), vol. 3, 1931-1937.

Turi, J.; and Bit-Monnot, A. 2022. Guidance of a Refinement-based Acting Engine with a Hierarchical Temporal Planner. In International Conference on Automated Planning and Scheduling, Workshop on Integrated Planning, Acting and Execution.

Veloso, M. M.; Perez, A.; and Carbonell, J. G. 1990. Non- linear planning with parallel resource allocation. In Proceedings of the DARPA workshop on innovative approaches to planning, scheduling, and control, 207-212. Morgan Kaufmann.

21. Verma, V.; Estlin, T. A.; Jonsson, A. K.; Pasareanu, C. S.; Simmons, R. G.; and Tso, K. S. 2005. Plan execution interchange language (PLEXIL) for executable plans and command sequences. In In Proc. International Symp. on Artificial Intelligence, Robotics and Automation in Space, 1-8.

\* cited by examiner

Listing 4: EBNF syntax definition for SC-PLEX- Table 1

```
 1  imports : imp_program;
 2  imp : IMPORT ((COMMA)? file_name)*;
 3  program : PROGRAM LPAR
 4          LCPAR
 5          r_functions
 6          RCPAR
 7          ((COMMA)? execute_mode)+
 8          RPAR;
 9
10  r_functions : (r_function)*?;
11  execute_mode : EXEC_MODE sentences;
12  sentences : LPAR ((COMMA)? sentence)+
13          RPAR;
14  sentence : var_assign|r_while|r_if|r_for
15          |r_case|execute_mode|func_call;
16  r_while : WHILE cond=condition_block COLON
17          (sent_mult=sentences|sent= sentence)
18          #whilestmnt;
19  r_if : IF condition_block COLON (sentences|sentence)
20          (ELSEIF condition_block COLON (sentences|
21          sentence))* (ELSE COLON (sentences|
22          sentence))?;
23  r_for : FOR iter_var= var IN lst=r_list COLON
24          (sent_mult=sentences | sent= sentence) #forstmnt;
25  r_case : CHECK mathematical_expr COLON LPAR (CASE
26          mathematical_expr COLON {
27          sentences|sentence})+
28          RPAR ;
29  condition : left=condition op=andor right=condition
30          #condnested
31          | LPAR NOT cond=condition RPAR #
32          Condnot
33          | comparison_expr #condcomp
34          | bool_lit #condbool;
35  action : logic_expr #actlog
36          | comparison_expr #actcomp
37          | var_assign #actvar
38          | mathematical_expr ~(SUB)
39          #actmath;
40  action_block : ((COMMA)? action)+ # blockact ;
41  condition_block : LPAR cond=condition RPAR
42          #condblock;
43  r_function : FUNC name=func_name LPAR
44          args=elements RPAR COLON (sent_mult=
45          sentences | sent=sentence)? (RETURN
46          LPAR ret_args=elements RPAR)?
47          #function;
48  sentences_func : ((SEMI)? sentence)+;
49  func_name : CHAR_LIT ;
50  func_call : name=func_name LPAR ele= elements
51          RPAR #function_call;
52          file_name: CHAR_LIT_DOT;
53  r_list : LSPAR (empty|elements) RSPAR ;
54  elements :((COMMA)? literal_expr)* ;
55  empty : ;
```

FIG. 4

Listing 5: EBNF syntax definition for SC-PLEX- Table 2

```
1  expression : comparison_expr
2            | bool_lit;
3  logic_expr : op=NOT expr=expression # notlogic
4            | LPAR left=expression RPAR
5            | op=andor LPAR right= expression RPAR
6            #andorlog;
7  comparison_expr : left=mathematical_expr
8            op=comp_oper right=mathematical_expr
9            #comp_expr;
10 var_assign : name=var_name op= ASSIGN_OPER
11           (lit_expr=literal_expr|
12            math_expr=mathematical_expr)
13           # var_assignment;
14 mathematical_expr : left= mathematical_expr
15            op_exp= arith_oper_exp right=opExpr
16           | left=mathematical_expr
17            mathematical_expr#opExpr
18           | op_multdiv= arith_oper_mult_div right=
19            mathematical_expr # opExpr
20           | left=mathematical_expr
21            op_addsub= arith_oper_add_sub right=
22            mathematical_expr # opExpr
23           | number=num #defnegnum
24           | variable=var #defvar
25           | boolvar=bool_lit #defbool;
26 literal_expr : num
27           | var
28           | bool_lit
29           | str_lit
30           | func_call;
31 str_lit : QUOTE (CHAR_LIT|WHITESPACE|
32            SYMBOL|BOT)* QUOTE;
33 bool_lit : BOOL_LIT ;
34 num : (SUB)? NUM;
35 var_name : CHAR_LIT ;
36 andor : AND|OR ;
37 log_oper : AND|OR|NOT ;
38 comp_oper : EQL_EQL|NOT_EQL|GNE|LNE|GEQ|
39            LEQ ;
40 arith_oper_add_sub : ADD|SUB ;
41 arith_oper_mult_div : MULT|DIVD ;
42 arith_oper_exp : EXP ;
43 var : CHAR_LIT ;
```

FIG. 5

Listing 6: EBNF syntax definition for SC-PLEX- Table 3

```
1   IMPORT : 'import' ;
2   COMMENT : '#' ~'?'/'\n' -> skip ;
3   R_TYPE : 'bool' | 'str' | 'int' | 'float' ;
4   EXEC_MODE : 'sequence' | 'parallel' | 'any_order' ;
5   BOOL_LIT : 'true' | 'false' ;
6   PROGRAM : 'program' ;
7   LPAR : '(' ;
8   RPAR : ')' ;
9   SEMI : ';' ;
10  COMMA : ',' ;
11  LCPAR : '{' ;
12  RCPAR : '}' ;
13  RSPAR : ']' ;
14  LSPAR : '[' ;
15  QUOTE : '\"' | "'" ;
16  FUNC : 'func' ;
17  COLON : ':' ;
18  RETURN : 'return' ;
19  DO : 'do' ;
20  WHILE : 'while' ;
21  IF : 'if' ;
22  ELSEIF : 'else if' ;
23  ELSE : 'else' ;
24  FOR : 'for' ;
25  IN : 'in' ;
26  CHECK : 'check' ;
27  CASE : 'case' ;
28  AND : 'and' ;
29  OR : 'or' ;
30  NOT : 'not' ;
31  EQL_EQL : '==' ;
32  NOT_EQL : '!=' ;
33  GNE : '>' ;
34  LNE : '<' ;
35  GEQ : '>=' ;
36  LEQ : '<=' ;
37  ASSIGN_OPER : '=' ;
38  EXP : '^' ;
39  ADD : '+' ;
40  SUB : '-' ;
41  MULT : '*' ;
42  DIVD : '/' ;
43  NUM : '-'?'0'..'9'+ ('.' ('0'..'9')*)? |
             ('.' ('0'..'9')+ ('.' ('0'..'9')+)) '0' ;
44  DOT : '.' ;
45  NONZERO : '1'..'9' ;
46  DIGIT : '0'..'9' ;
47  INT : ('0'..'9')+ ;
48  CHAR_LIT : ('a'..'z'|'A'..'Z'|'0'..'9' ) ;
49  CHAR_LIT_DOT : ('a'..'z'|'A'..'Z'
                    |'0'..'9'|'_'|'-')+ ;
50  WHITESPACE : (' '|'\t'|'\r'|'\n'|'pass'
                  |'#'|-> skip ;
51  SYMBOL : ('~'|'!'|'@'|'%'|'&'|'|'|'('|')'
                |'['|']'|'{'|'}'|'?') ;
```

FIG. 6

SYSTEM CONTROL LANGUAGE FOR PLANNING AND EXECUTION

FIELD OF TECHNOLOGY

The present disclosure generally relates to Artificial Intelligence (AI) planning. More specifically, the present disclosure relates to system control languages for planning and execution.

BACKGROUND

AI planning involves the process of reasoning about goals, actions, and outcomes to generate plans that can be executed by autonomous agents. Notable examples of AI Planning include the navigation of autonomous vehicles and spacecraft operations like that of the Mars Rover. However, a critical issue lies in the intersection between planning and acting. While plans are defined using high-level abstract actions, executing them requires low-level commands that can be connected to areal-world executor.

Planning uses an agent's initial state and generates a sequence of actions with the intent of achieving the agent's goals. Thus, a key component of a comprehensive planning framework is the ability to execute plans. Most conventional teachings address the connection between planning and execution (Ingrand et al. 1996; Simmons and Apfelbaum 1998; Guzman et al. 2012; Pinover et al. 2020; Cashmore et al. 2015), with some (Patra et al. 2019b; Ghallab, Nau, and Traverso 2016) paying particular attention to the use of a three-tiered architecture for the proposed systems that would be composed of a deliberative planning component, an acting component, and an executive. In particular, the descriptions herein describe the acting component. Embodiments of the disclosure take, as input a plan, execute each action in the plan, and monitor the execution of corresponding action (inter and post execution).

While most architectures have been mainly used to control robotic systems, (Pinover et al. 2020; Schaffer et al. 2018), they are general enough to be used in other related domains, such as games, logistics, or workflow execution for business processes. Each of these types of applications require a different kind of executive. For instance, the Robotic Operating System (ROS) (Macenski et al. 2022) is used for robotic tasks, while Decision Model and Notation (DMN) (Object Management Group 2021) is commonly used for workflow applications. Embodiments of the present disclosure provide an executive that is independent of the application it is being used in.

These previous works have proposed many different ways to create the acting component, ranging from (Verma et al. 2005; Ingrand et al. 1996; Ingham, Ragno, and Williams 2001). These approaches are very flexible in the kinds of acting code they can generate but lack seamless integration with external libraries.

SUMMARY

Given the aforementioned deficiencies, what is needed are systems and methods that provide new programming languages that bridge the gap between planning. acting, and execution. What is also needed are systems and methods that provide a simple interface to define an acting layer with classical execution-monitoring constructs and seamless integration with external libraries.

In certain circumstances, an embodiment of the present disclosure includes a system control planning-execution monitoring architecture, comprising a planning domain file configured to analyze planning domain related files received from a user and specify a planning domain; a planning problem file configured to analyze planning problem related files received from the user and specify a planning problem therefrom and a planner module configured to receive the planning domain and planning problem files, defined in Planning Domain Definition Language (PDDL) and output a plan including a list of actions for completion by the system. The system also produces an Acting Language (ALA) control program responsive to the plan output from the planner module by means of a compiler module, the ALA program including embedded monitoring checkpoints. A syntactic analysis module is configured to receive as an input the ALA program and definition of a syntax of the ALA program and produce an Abstract Syntax Tree (AST) therefrom; and an executive module configured to (i) receive the planning domain file, (ii) determine how components of the syntax should be executed, and (iii) execute the ALA program based on the input received from the planning domain file in the components of the syntax.

There has been recent work that proposes to define a middle layer between planning-based generated plans, which define high-level abstract actions, and low-level commands connected to a real-world executor. This middle layer is usually termed as acting.

Current approaches to implement the acting layer vary, from solutions utilizing declarative or programmatic language representations, to proposed solutions that do not incorporate a planner, and ones that utilize hierarchical planning constructs and plan refinement frameworks. In this paper, we propose a new programming language that provides a simple interface to define the acting layer with classical execution-monitoring constructs.

This language is seamlessly integrated with an object-oriented, high-level programming language with dynamic semantics. By way of example only, and not limitation, Python is one such language. As understood by those of skill in the art, Python is a general purpose programming language, that adds total flexibility to creating acting code. Embodiments of the present disclosure also provide a compiler from plans to acting code in that programming language. One exemplary successful use of this programming language includes creating an open control program for an office robot.

Most conventional approaches discuss the connection between planning and execution, with some paying particular attention to the use of a three-tiered architecture for the proposed systems that would be composed of a deliberative planning component, an acting component, and an executive. In particular, the embodiments provide an acting component. One illustrious embodiment takes as input a plan, executes each action in the plan and monitors the execution of the action (inter and post execution).

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 4 illustrates a first table of Extended Backus-Naur Form (EBNF) syntax definitions for CLAPLEX according to the embodiments.

DETAILED DESCRIPTION

This disclosure describes systems, apparatuses, and methods related to a new system control language for planning and execution that includes a simple interface defining the acting layer with classical execution-monitoring constructs.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that software, process, electrical, and structural changes may be made without departing from the scope of the present disclosure.

Provided is a planning-execution architecture, based on the integration of deliberative planning with a programming language, CLAPLEX. CLAPLEX allows developers to easily deploy acting and execution code. The connection between planning and execution is realized by compiling plans into control programs in ALA program, the CLAPLEX acting language, that include the execution and monitoring of actions. The connection between CLAPLEX and any external system, such as ROS, responsible for executing the external system's primitive actions, is done by defining functions in the language that the ALA code is interpreted in. Given the use of Python, the execution of the controller defined in CLAPLEX can be easily linked to any external software libraries and tools used to build applications in this external system.

Figure 1:
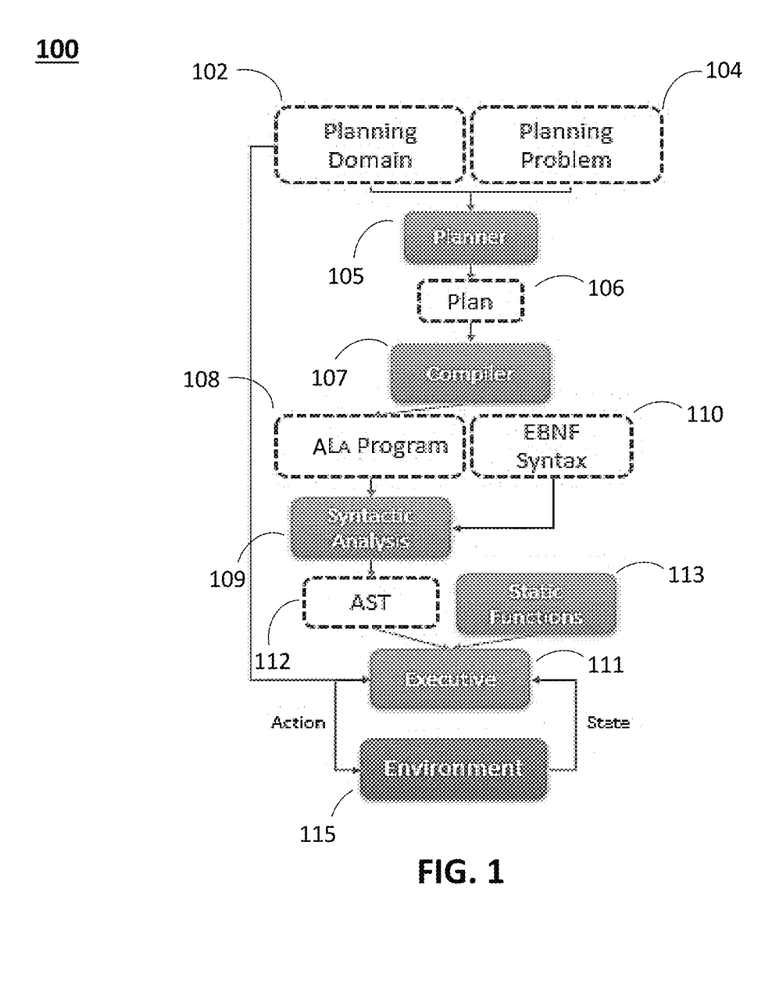
FIG. 1 illustrates an exemplary Control Language and Architecture for Planning-Execution (CLAPLEX) monitoring architecture in accordance with embodiments of the disclosure.

FIG. 1 depicts an exemplary planning-execution architecture 100 of CLAPLEX. The boxes in dashed outline represent input/output information, while the solid filled boxes represent modules. The CLAPLEX architecture 100 includes pre-existing open source architecture blocks (e.g., 105/109) integrated with scripts blocks (e.g., 107/111/113), written for example, in Python, that facilitate planning and allow the user to solve the problem.

By way of example, if the problem in a robotics environment (i.e., a representative environment) is defined in the manner of telling the robot to "go to the kitchen," planning domain 102 and planning problem files 104 act as inputs to planner 105, which will generate plan 106. The plan 106 is in the form of a list of actions to be completed by the user.

A compiler module 107 is generated, which is essentially a program that receives the plan 106 as an input and produces a program (e.g., ALA program) executable in the ALA language. That is, the compiler module 107 is basically a bridge between the plan 106 and an ALA program 108.

Figure 5:
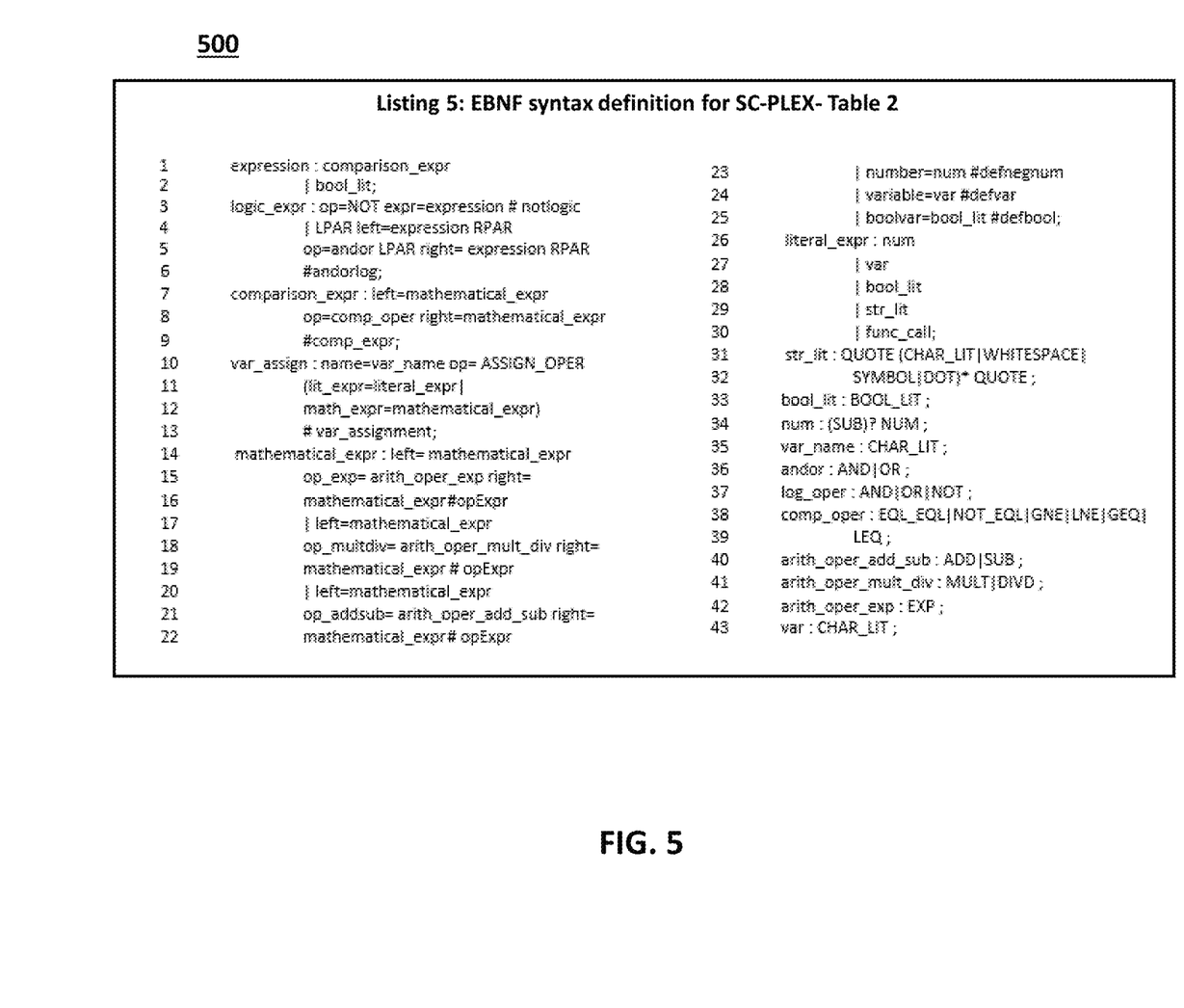
FIG. 5 illustrates a second table of EBNF syntax definitions for CLAPLEX according to the embodiments.
Figure 6:
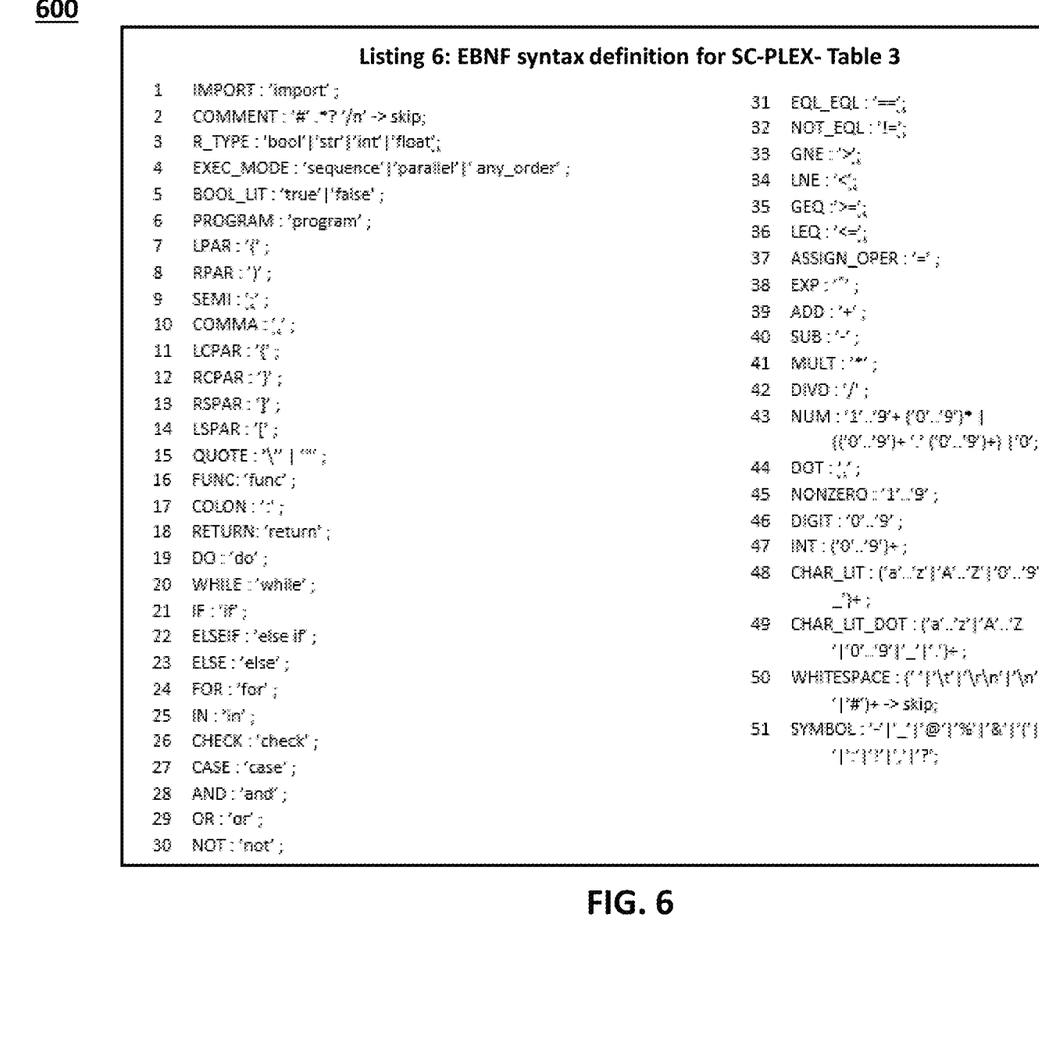
FIG. 6 illustrates a third table of EBNF syntax definitions for CLAPLEX according to the embodiments.

The CLAPLEX architecture 100 generates the ALA programming language, depicted in greater detail in FIGS. 4-6.

The ALA program 108 and the defined EBNF syntax 110 are input to an open source syntactic analysis module 109 that takes in the syntax, follows the syntax, and generates an AST 112 of the ALA program 108 that is input to an executive module 111, together with an output from a static functions module 113.

In one illustrious embodiment, the executive module 111 may execute an action for the robot, for example, to move forward 1 meter and at the same time receives cues from sensing (seeing, listening to what happens in the environment while the action is executed). Using these sensing primitives, the robot is able to calculate its own state. That information is provided to the executive module 111 which monitors the state for any potential future failures.

Scaffolding code of the interpreter is generated by an open source library and filled with instructions on how each component of the syntax should be executed. Once the user fills in the interpreter, the executive module 111 can call on the interpreter. The executive module 111 also receives an input from the planning domain file 102 regarding what the environment (e.g., robotics environment) looks like and executes the program as is. The executive module 111 then receives inputs from environment 115 (i.e., the environment in which the system operates in), monitoring the current state.

In the example of the robot, the environment 115 might be the room the robot is operating. Its state is monitored by the robot sensing its location. The state is monitored by the executive module 111 to make sure the next action in plan/program may be executed without failure.

The syntactic analysis module 109 checks that the ALA program 108 follows the syntax specified in the EBNF syntax specification, while the Executive calls on the interpreter which executes the ALA program 108. Scaffolding code representation of the interpreter is generated by ANTLR. The rest of the interpreter may specify how different parts of the program will be executed. The user only needs to fill in the interpreter once.

The interpreter may be viewed as a specification program that provides the executive module 111 with information on how to execute different parts of the ALA program 108. By calling on the interpreter, the executive module 111 simply executes the program 108. For example, in the case of the robot, the executive module 111 would use the interpreter to execute an action to move forward, and in response, the robot would move forward.

The exemplary embodiment depicted in FIG. 1 provides an ability (i.e., a language) to go from an abstract representation into specific commands. As noted earlier, the embodiments provide the ability to go from a plan, that is an abstract description, to how to create the infrastructure or pipeline that goes from the language into something executable.

Consider extending the example above to instructing the robot to go to the kitchen and make coffee, which would be very abstract for the robot. That is, the robot has no context to know what these items/articles are. The embodiments, however, facilitate going from the language into something that can be executed within the robot, that could be things like "move the right wheel with a velocity of XYZ during a specific time period."

The ALA program language has similarities with other languages, in being familiar with concurrent and sequential processing constructs. In the context of the robot example such constructs might include "execute these sections in parallel," or "this first section must be executed before executing any other section," or "please ensure you can view the coffee machine," or similar." The reason for this is the ALA program language has similarities with other languages but does not have specific abilities to understand things related to planning. The plan generated by the planner is translated to ALA by the Compiler module. So, once the ALA program 108 is generated, it exists independently and can be executed independently of any planning components. The interpreter has been programmed to know when a specific language construct asks for an action to be executed in parallel or in a sequence.

With the definition of the ALA syntax in EBNF format, in FIG. 1, the syntactic analysis module 109 produces the AST 112 which is used together with the static functions module 113 by the executive module 111 to execute each action in the environment. The static functions module 113, by way of example, may be a Python program containing definitions of primitive functions for the execution, as well as the functions responsible for regressing action preconditions to compute monitoring checks and execute the monitoring actions. The static functions module 113 is imported at the top of the ALA program 108 and is called whenever a primitive, or a monitoring action is requested.

Finally, the executive 111 receives the planning domain file and problem file as inputs that are used to compute the regressed precondition of the plan 106 and state information from the environment to support the execution of the ALA program 108. By way of background, the planning domain file 102 and the planning problem file 104 are merely files and are inputs to the executive module 111.

Greater details of the blocks 102/104/106/108/110/112 of the CLAPLEX architecture 100 are provided. The CLAPLEX architecture 100 receives the planning domain file 102 and planning problem file 104 as inputs to the planner module 105. The planner module 105 is given these inputs and solves to generate the plan 106. The plan 106 is then automatically compiled (via the compiler module 107) into the corresponding ALA program 108 in a domain-independent fashion. In generating ALA code, the compiler module 107 is also responsible for embedding monitoring checkpoints in the ALA code. By way of example, Technique #1 (below) is one approach for embedding the monitoring checkpoints in the ALA code.

---

1: L ← ['p = get regressed preconds( )']
2: for ∀i ∈ {1,N} do
3:     L ← L + ['execute($A_i$)']
4: L ← L+ ['if monitor(p($A_i$)) = fail then fail']
5: end for
6: return L

---

Technique # 1 (embedding monitoring checks in the SC-$L_A$ code)

Input: Plan as a sequence of actions, a={A1 . . . AN}, Output: List of execution-monitoring commands to be included in the control program, which details the way in which monitoring checkpoints are included in the ALA code by appending strings to list L and eventually adding the strings to ALA code. These strings include the pieces of code responsible for regressing preconditions and executing monitoring checks and plan actions. The technique begins by adding to list L the regressed preconditions function and assigning it to variable p.

Since the executive 111 receives the planning domain file 102 and the planning problem file 104, they do not need to be added as parameters to the obtain the regressed preconditions function. Next, the technique loops over the number of actions in the plan 106 and appends to the list the command responsible for executing the current action. Finally, the technique adds a conditional statement command to the list of ALA commands that checks whether the monitoring function returns 'fail' for the current action and halts execution if that is true, else continues with the loop.

The monitoring checks are responsible for pulling the regressed preconditions of the actions to be executed and assessing if the plan 106 will fail at any of the future action steps. The functions used to monitor execution may be placed, for example, in a script written in the language that the ALA is interpreted in. Thus, the interpreter executes the actions in the plan 106 while at the same time functioning as an execution monitoring module. The executive module 111 may halt the execution of the plan as soon as the regressed preconditions fail for the action at hand. Performance of replanning may occur at this point.

ALA—The Language. ALA is a high-level, modular, highly orthogonal programming language for system control. The following subsections provide details of the language's functionality and semantics, its syntax, and the development of the interpreter. An example of an ALA program utilizing a good proportion of the currently available ALA functionality is also provided.

Functionality and Semantics. A top-level execution mode specification, loops, if/while statements, function definitions and function calls are some of the constructs built into the ALA language capabilities. These, together with support for conditional branching, variable assignments, and mathematical and logical expressions make up ALA's rich control architecture.

Additionally, Python has been integrated with the language in the form of function imports from separate Python scripts, promoting code simplicity and the ability to expand the language's capabilities to all additional Python constructs and packages. Potential uses include, but are not limited to, the integration of the CLAPLEX control program with external systems, such as robots, and the use of primitive functions to call on the execution of actions in these systems.

The language has been developed to execute an ordered set of actions, in one of three modes: sequential execution, parallel execution or any-order execution. These modes mimic the different plan control structures. Sequential execution allows for the simpler total-order type of plans. And parallel and any-order allow for the execution of parallel and partial-order plans, respectively. Nesting of different execution modes is allowed.

Syntax. The embodiments provide a plan produced by the planner module 105 and its translation to ALA code. The use case here involves a robot with moving and speech primitives. The plan solution is provided in Listing 1 and includes a move action from position c1 to position c2, followed by a greeting action at c2 that checks that the robot and human are in the same location and finally a second move action from c2-c4.

In this example, parameters prefixed by the letter c signify locations, while the ones prefixed by p signify people. The compiler module 107 is used to convert a PDDL solution to ALA code. The equivalent ALA code is included in Listing 2. That is, the Listings 1 and 2 show the plan and the translation into ALA.

---
Listing 1: PDDL generated plan
---

```
1    (move c1 c2)
2    (greet-human p1 c2 c2 hi)
3    (move c2 c4)
```

Listing 2: Translated SC-LA code from PDDL code in Listing 1

```
1    import static_funtions
2    program{{ }
3    sequence{
4      p = regressed_preconds{ },
5      move['c1', 'c2'],
6      if(monitoring(p(1)) == 'fail'):
7        fail( )
8      else:
9        greet_human('p1', 'c2', 'c2', 'hi'),
10     if (monitoring(p(2)) == 'fail'):
11       fail( )
12     else:
13       move('c2', 'c4')))
```

As shown in the automatically generated acting program, the static functions module is imported at the top of the script. This is the static functions module 113 specifies the primitives and is responsible for calling ROS to execute them. Then, the control part of the script starts. Curly brackets inside program designate allocated space for function definitions, which for simplicity could be transferred to a separate script and instead imported at the top.

Directly below, the control sequence is called and prefixed with a mode of execution keyword, in this case sequence. Inside the brackets of the execution mode keyword, the syntax allows us to use different control constructs like while-loops and if-statements. For this example, we simply call the appropriate primitive functions corresponding to the actions specified in the plan.

In generating this program automatically, the compiler takes the plan and uses Technique #1 to obtain a sequence of commands that includes monitoring. The compiler also embeds a regressed preconditions command at the beginning of the program. Furthermore, monitoring checks are added between each action in the plan. In this way, the plan's regressed preconditions are computed at the beginning and the monitoring actions confirm that the preconditions of the actions in the remaining part of the plan are met. Conditional statements are used and are dependent on the return values of the monitoring actions to decide whether to execute the next action in the plan. As shown in Listing 2 (above), the program only allows the execution of greet_human if the first monitoring check does not return 'fail.'

Interpreting ALA code. To execute code written in ALA, an interpreter is used. By way of example only, and not limitation, in the embodiments, ANother Tool for Language Recognition (ANTLR), a parser generator, is used as the basis for the interpreter. ANTLR supports the development of an executive in two ways. It can be used to check that the CLAPLEX program is syntactically correct and builds the corresponding AST 112.

ANTLR takes as an input the EBNF syntax, provided herein, and generates parser, lexer and visitor files to support the interpreter development. Finally, ANTLR takes as an input a new CLAPLEX script, builds the AST 112 and uses an interpreter to execute the commands in the code. CLAPLEX—A Robot Domain Use-Case.

An example ALA program, called robot_interact, demonstrates the extent of ALA's functionality after enhancements were made to allow for actions to be executed in parallel or in any order. The key words "parallel" and "any-order" are used to replace the keyword sequence in the original form of the language.

The program is shown in Listing 3 (see below). While this program has been written manually, the execution is completely automated by interpreting this code and sending the corresponding commands to the robot through ROS. By way of example, the program was executed on a robot with motion, speech and object recognition primitives. All of the robot primitives are utilized, in the example, and showcase the ability of the program to create open loops. Robot primitives are called using ROS (Macenski et al. 2022). ROS provides us with a set of libraries and tools useful for building robot applications.

---
Listing 3: SC-LA control program for robotinteract
---

```
1    import static_functions
2    program({ }
3    sequence{
4      v = 0,
5      h = 0,
6      parallel{
7        while (true):
8          (h =human_check{ },
9          v = obstacle_check( )),
10       while (true):
11         if (v == 0):
12           forward(0.3)
13         else:
14           (r_a = random_angle( ),
15           move(0, r_a),
16           wait(2)),
17       while (true):
18         if(h == 1):
19           (speak("Hello"),
20           west(15)))))
```

Additional modules, available in the language that the interpreter is built in, which are responsible for calculating execution time and generating random numbers are used and support the execution. Execution using the time module is halted to let the robot interact more fluidly with the environment while the random module's random number generator function is used to choose a random angle for the robot to turn when it finds an obstacle. ALA empowers the seamless integration of Python and ROS in this example by utilizing external modules and connecting and executing primitive actions on the robot while at the same time demonstrating the language's simple syntax for system control.

At the start of the program, a sequential execution mode is used to assign a value to variables v and h, Boolean variables for obstacle detection and human recognition. Then, a parallel execution of sensing primitives is used for human recognition and obstacle detection, forward motion and speech. As soon as the robot detects an obstacle, it stops moving forward and chooses a random angle to turn to before continuing execution. At the same time, the robot greets a person as soon as it detects one.

Figure 2:
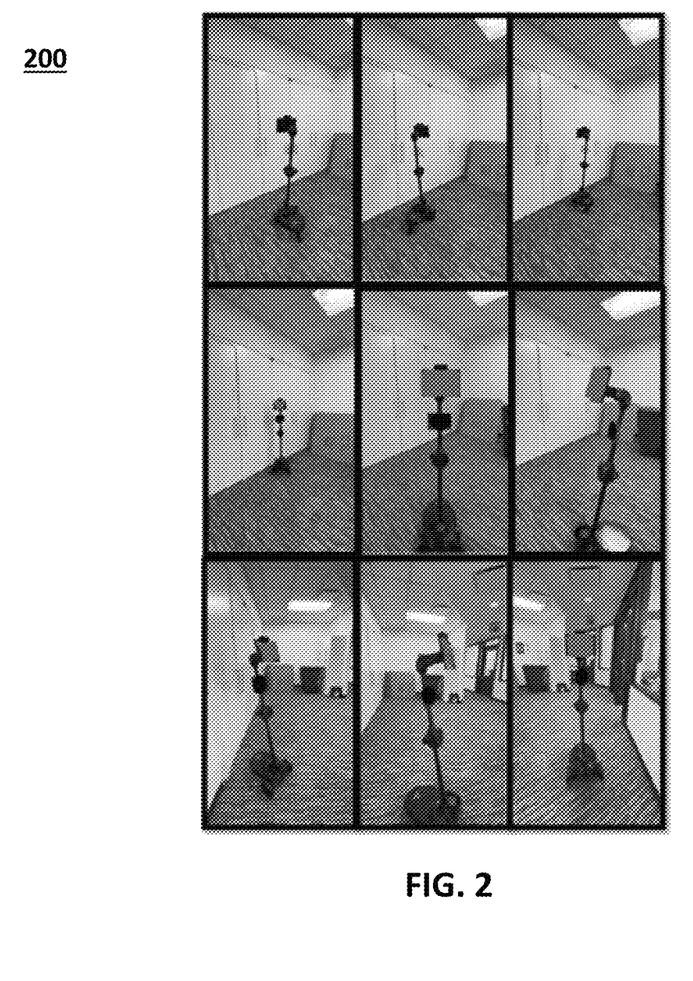
FIG. 2 illustrates a robot executing code and performing a task, in accordance with the embodiments.

FIG. 2 is an exemplary illustration 200 depicting nine video frames of the robot performing a task, in accordance with the embodiments. The robot is originally placed facing the wardrobe. As seen in FIG. 2, as soon as the robot begins moving it sees the wardrobe and turns to the right. The robot avoids the wardrobe a second time between frames 3 and 4 and begins moving towards the camera. As the robot moves towards the camera, it recognizes a human behind the camera and says Hello. It then turns and moves away from the camera because it recognizes the human as an obstacle.

Multiple works on the integration of planning and acting have been explored in the literature. One may find characteristics of the CLAPLEX control and execution language in prominent languages including plan execution interchange language (PLEXIL) (Verma et al. 2005), Reactive Model-Based Programming Language (RMPL) (Ingham, Ragno, and Williams 2001) and Test Description Language (TDL) (Simmons and Apfelbaum 1998). Modularity, expressivity and syntax simplicity are shared by all four languages, with additional common characteristics listed below.

PLEXIL's tree like structure which includes action leaf nodes and expandable control nodes in the tree, is equivalent to ANTLR's native tree like structure, available to the user and implicitly embedded to the ALA interpreter. The distinguishing aspect of ALA is that the code does not include embedded tree like programming constructs and is written in a simpler language format, easily interpreted by new users.

The ALA non-declarative, programmatic representation has allowed the language to be fully integrated with Python libraries. An additional advantage to PLEXIL is that the code fed to the interpreter is readable, as opposed to Extensible Markup Language (XML) code sent to PLEXIL's Universal Executive (as recognized by its authors (Verma et al. 2005)). Just as PLEXIL, ALA can be utilized as a standalone execution-only system.

RMPL supports similar constructs to ALA, including conditional branching, iteration, parallel composition, sequential ordering and preemption (Ingham, Ragno, and Williams 2001). However, while RMPL code specifies the state to be achieved and not the action to be executed, CLAPLEX actions are decided by a planning module. RMPL's constraint-based modeling and language contracts like parallel and sequential execution, and IF-THENNEXT-ELSENEXT, UNLESS-THENNEXT, WHEN-DONEXT, WHENEVER-DONEXT, DO-WATCHING control constructs, are simplified by ALA's if-else, for/while loop statements and keywords like parallel/sequence. Thus, SCLA covers the extent of the RMPL functionality, but using a simpler language.

TDL and ALA differ in how the resulting control code is executed. While TDL is compiled to C++ code before execution (Simmons and Apfelbaum 1998), ALA is interpreted and executed in Python. The TDL utilization of a C++ platform-independent task-management library is comparable to ALA's ability to utilize functions and primitive calls held externally in separate scripts and imported to the executing script, promoting clean scripting and code modularity. In the CLAPLEX case, this library exists in two modes, ALA code, or Python code.

The functions contained in the scripts can include from simple primitive action execution to complex control and monitoring structures. Just as the CLAPLEX-Python integration, the TDL-C++ integration encodes the scripted code into a Task-trees. While TDL includes a elaborate structure on task tree execution flow, ALA's use of ANTLR, an off-the-shelf parser generator, means that there is no need to explicitly develop an AST or its traversal logic.

Behavior trees are the de facto standard in the gaming industry for use in the control structure and behavior of non-player characters and for robotic manipulation (Colledanchise and Ogren 2017). Our choice of embedding function return values in the ALA syntax and the ANTLR parser generator, creates a programming language with control structure and semantics resembling the execution flow of behavior trees (top to bottom and left to right execution), promoting modularity and supporting two-way control transfers (Colledanchise and Ogren 2017). In the case of TDL, its functions have no return values and thus, two way control transfers are not supported.

The Procedural Reasoning System (PRS) is another control and monitoring language with a declarative representation syntax supporting reactive reasoning capabilities and the ability to be asynchronously connected to low-level modules (Ingrand et al. 1996). We can draw a parallel between ALA and PRS in that while ALA is not represented declaratively, it does indeed support reactive reasoning, because of its rich control constructs and its seamless integration in Python. The two languages differ in that PRS does not incorporate a planner, rather calls a library of pre-specified plans and chooses among the ones most suitable for the goal at hand.

APEPlan and RAE-Plan use Monte-Carlo simulation rollouts of the relevant operational models for planning and plan refinement (Patra et al. 2019b,a). UPOM provides a solution to search this operational model space and make decisions about finding a near-optimal method for the current action (Patra et al. 2020). Hy-CIRCA focuses on providing a control structure for hybrid systems and combines the ideas seen in multiple other papers on plan refinement, hierarchical planning and an execution engine for coordination and replanning (Goldman et al. 2016). Similarly, (Turi and BitMonnot 2022) uses hierarchical operational models and a Reactive Acting Engine (RAE) implementation for plan refinement. This paper analyses the operational model and extracts planning domains from acting domains to select the best model for the task at hand.

The embodiments provide a language that includes expressive constructs with rich control while fully integrating the language with a high-level programming language. To solve this reconciliation issue, APE uses the operational model for both acting and planning, which we defer to later research. Currently, CLAPLEX uses a planning module to generate plans and a compilation module to automatically generate ALA acting code.

Finally, ROSPlan, (Cashmore et al. 2015) reconciles the solution of a PDDL planner, generated on an abstract model of the world, with ROS, a system that calls on a robot's low level controls. Embodiments of the present disclosure may also use ROS to execute robot primitives. Additionally, CLAPLEX may be utilized to call any library supported by Python, not only ROS. Accordingly, CLAPLEX can be used with any other software supporting robotics as well as any other type of applications, as long as the execution system can be called within Python.

As disclosed herein, CLAPLEX is a system control, planning and execution programming language which aims to bridge the gap between planning, acting and execution. The language syntax and semantics resemble the compactness of a program written in Python, while keeping a top-level control structure, and potentially more complex and fluid inner architecture. The embodiments also provide the language syntax in EBNF together with some information on how the interpreter was built using ANTLR.

In the future, we would be interested to explore potential extensions of the current monitoring framework to reason about other replanning strategies while executing. Additionally, recent work describes how Monte Carlo rollouts can be used for plan refinement (Patra et al. 2019b,a). This technique could allow dropping the PDDL solution to ALA program translation and bridge the gap in abstraction between our declarative planning solution and programmatic execution.

Embodiments of the present disclosure may also support the automatic compilation of parallel and any-order plans to resemble our current ability to automatically generate ALA code from sequential plans.

Figure 3:
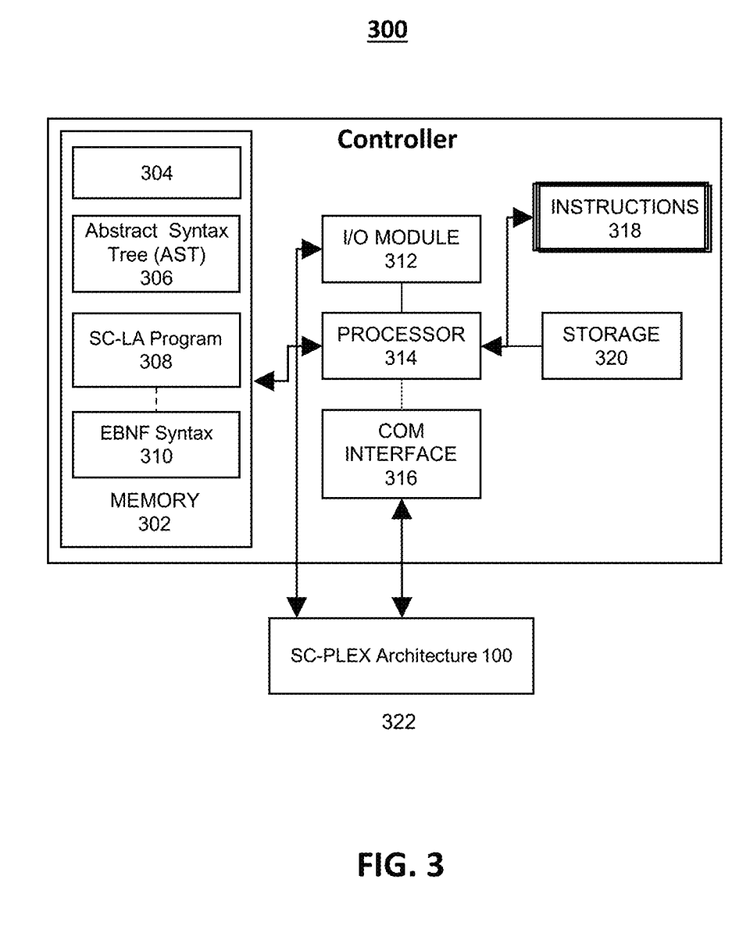
FIG. 3 illustrates a use case of an exemplary messaging scenario between elements of the present system and method.

FIG. 3 illustrates a controller 300 that may be an application-specific hardware, software, and firmware implementation of the CLAPLEX planning-execution-monitoring architecture 100 in FIG. 1, described above. The controller 300 can include a processor 314 configured to be executed one or more, or all of the blocks of the modules of FIG. 1, or the functions of the exemplary CLAPLEX architecture 100 described above.

The processor 314 can have a specific structure imparted to the processor 314 by instructions stored in a memory 302 and/or by instructions 318 fetchable by the processor 314 from a storage medium 320. The storage medium 320 can be remote and communicatively coupled to the controller 300. Such communications can be encrypted.

The controller 300 can be a stand-alone programmable system, or a programmable module included in a larger system. For example, the controller 300 may include or be connected with the CLAPLEX planning-execution-monitoring architecture 100. For example, the controller 300 may include one or more hardware and/or software components configured to fetch, decode, execute, store, analyze, distribute, evaluate, and/or categorize information.

The processor 314 may include one or more processing devices or cores (not shown). In some embodiments, the processor 314 may be a plurality of processors, each having either one or more cores. The processor 314 can execute instructions fetched from the memory 302, i.e., from one of memory modules 304, 306, 308, or 310. Alternatively, the instructions can be fetched from the storage medium 320, or from a remote device connected to the controller 300 via a communication interface 316. Furthermore, the communication interface 316 can also interface with computer systems within a computer system of the CLAPLEX architecture 100. An I/O module 312 may be configured for additional communications to or from associated remote systems of a host 322 of the CLAPLEX architecture 100.

Without loss of generality, the storage medium 320 and/or the memory 302 can include a volatile or non-volatile, magnetic, semiconductor, tape, optical, removable, non-removable, read-only, random-access, or any type of non-transitory computer-readable computer medium. The storage medium 320 and/or the memory 302 may include programs and/or other information usable by processor 314. Furthermore, the storage medium 320 can be configured to log data processed, recorded, or collected during the operation of controller 300.

The data may be time-stamped, location-stamped, cataloged, indexed, encrypted, and/or organized in a variety of ways consistent with data storage practice. By way of example, the memory module 306 can form the AST module, the memory module 308 can form the previously described CLAPLEX architecture 100, and the memory module 310 may form the EBNF Syntax. The instructions embodied in these memory modules can cause the processor 314 to perform certain operations consistent with the functions described in FIG. 1 above.

The embodiments provide a planning-execution architecture, based on the integration of deliberative planning with a programming language, CLAPLEX. CLAPLEX allows developers to easily deploy acting and execution code. The connection between planning and execution is realized by compiling plans into control programs in ALA, the CLAPLEX acting language, that include the execution and monitoring of actions. The connection between CLAPLEX and any external system, such as ROS, responsible for executing the external system's primitive actions, is done by defining Python functions that can be embedded in the code of the ALA control program.

Given the use of Python, the execution of the controller defined in CLAPLEX can be easily linked to any external software libraries and tools used to build applications in this external system. Herein, CLAPLEX is introduced and the framework architecture is described. Also provided are examples of an automatically generated program, along with a description of how it has been integrated with an execution and monitoring framework. Additionally, the ALA programming language is introduced, the language syntax in EBNF format is provided, and designs made for language semantics are discussed. The interpreter is presented along with a description of how the language was used on a robot domain use case.

FIGS. 4-6 include exemplary illustrations of EBNF syntax of ALA. Specifically, FIG. 4 illustrates a first table 400 of EBNF syntax definitions for CLAPLEX according to the embodiments. FIG. 5 illustrates a second table 500 of EBNF syntax definitions for CLAPLEX according to the embodiments. FIG. 6 illustrates a third table 600 of EBNF syntax definitions for CLAPLEX according to the embodiments.

By way of review, the embodiments provide a programming language that bridges the gap between planning, which produces an abstract solution, and execution of a program, which is basically what machines are instructed to do: perform the actions the plan is requesting.

In AI planning, one goal is to describe an environment such as a robot moving around with a specific goal being to have the robot to perform specific tasks, such as going to the kitchen and making coffee. In this example, a user will (i) describe the environment of the prerequisites for the robot to be able to be eligible to perform a specific action, and (ii) determine the effects of the action. There may be multiple actions capable of being performed and depending on the state of the environment at a specific point in time, and whether it is in that state, it fulfills the prerequisites of specific actions.

That is, the programming language desirably enables a user to go from the plan, which is something very abstract, into the specific commands that may be performed or executed by the robot. In this manner, the programming language is an intermediate language between plan and the commands provided to the robot.

In the embodiments, functions that that exist, like packages that exist in the ALA programming language, may be used or interpreted by other programming languages. For example, Python has been integrated with the language in the form of function imports from a separate Python scripts, promoting code simplicity. An ability is provided in the embodiments to expand the capabilities to all additional Python constructs and packages. Although embodiments of the invention interpret the language in Python, the interpreter may be written in other programming languages like C++ or Java, which are within the spirit and scope of the present disclosure.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system control planning-execution monitoring architecture, comprising:
   a planning domain file written in planning domain definition language (PDDL) received from a user;
   a planning problem file received from the user and specifying a planning problem therefrom;
   a planner module configured to receive the planning domain file and the planning problem file and output a plan including a list of actions for completion by the user;
   a compiler module configured to produce an active language (ALA) program responsive to the plan output from the planner module, the ALA program including embedded monitoring checkpoints;
   a syntactic analysis module configured to receive as an input the ALA program and definition of a syntax of the ALA program and produce an abstract syntax tree (AST) therefrom; and
   an executive module configured to (i) receive the planning domain file, (ii) determine how components of the AST should be executed, and (iii) execute the ALA program based on the planning domain file and components of the AST.

2. The system of claim 1, wherein the executive module is configured to receive a representatives environment input.

3. The system of claim 2, wherein the representative environment input represents an environment in which an architectural derived system is configured to operate.

4. The system of claim 3, wherein the architecture is based upon the control language and architecture for planning-execution (CLAPLEX) programming language.

5. The system of claim 1, wherein architecture includes an integration of open source architecture blocks with scripts block.

6. The system of claim 1, further comprising a static functions module (i) including definitions of primitive functions, (ii) configured to generate monitoring checks as an output therefrom based upon the primitive functions, and (iii) provide the output to the executive module.

7. A method for forming a system control planning-execution monitoring architecture for execution by a computer having one or more processing modules, the method comprising:
   receiving, via a planner module, a planning domain file written in planning domain definition language (PDDL) and a planning problem file specifying a planning problem, the planner module producing a plan listing as an output therefrom;
   producing, via a compiler module, an active language (ALA) program (i) responsive to the planner module output and (ii) including embedded monitoring checkpoints;
   receiving, via a syntactic analysis module, the ALA program and the definition, the syntactic analysis module and producing an abstract syntax tree (AST) therefrom; and
   executing, via an executive module, the ALA program based on the planning domain file and components of the AST.

8. The method of claim 7, wherein the executive module is configured to receive a representative environmental input.

9. The method of claim 8, wherein the representative environment input represents an environment in which an architectural derived system is configured to operate.

10. The method of claim 9, wherein the architecture is based upon the control language and architecture for planning-execution (CLAPLEX) programming language.

11. The method of claim 10, wherein the architecture represents integrating open source architecture blocks with scripts blocks.

12. The method of claim 7, further comprising generating, via a static functions module including definitions of primitive functions, monitoring checks as an output therefrom based upon the primitive functions, and providing the output to the executive module.

13. A computer-readable, non-transitory storage medium storing instructions that, when executed by a computer having one or more processing modules, causes the processing modules to execute a method comprising:
   receiving, via a planner module, a planning domain file written in planning domain definition language (PDDL) and a planning problem file specifying a planning problem, the planner module producing a plan listing as an output therefrom;
   producing, via a compiler module, an active language (ALA) program (i) responsive to the planner module output and (ii) including embedded monitoring checkpoints;
   receiving, via a syntactic analysis module, the ALA program and the definition, the syntactic analysis module and producing an abstract syntax tree (AST) therefrom; and
   executing, via an executive module, the ALA program based on the planning domain file and components of the AST.

14. The computer-readable medium of claim 13, wherein the executive module is configured to receive a representative environment input.

15. The computer-readable medium of claim 14, wherein the representative environment input represents an environment in which an architectural derived system is configured to operate.

16. The computer-readable medium of claim 15, wherein the architecture is based upon the control language and architecture for planning-execution (CLAPLEX) programming language.

17. The computer-readable medium of claim 16, wherein the architecture represents integrating open source architecture blocks with scripts blocks.

18. The computer-readable medium of claim 13, further comprising generating, via a static functions module including definitions of primitive functions, monitoring checks as an output therefrom based upon the primitive functions, and providing the output to the executive module.

* * * * *